Figure 1:
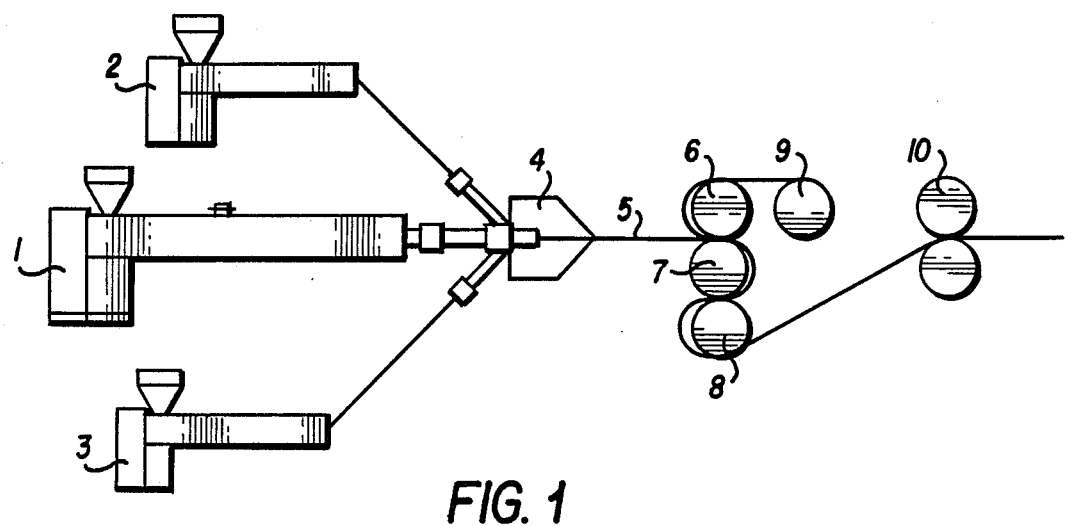

United States Patent [19]

Biglione et al.

[11] Patent Number: 4,868,058
[45] Date of Patent: Sep. 19, 1989

[54] MULTILAYER POLYMERIC COEXTRUDED SLABS AND STRUCTURAL SHAPES

[75] Inventors: Gianfranco Biglione, Mantova; Gian Claudio Fasulo, San Silvestro di Curtatone, both of Italy

[73] Assignee: Montedipe S.p.A., Milan, Italy

[21] Appl. No.: 183,518

[22] Filed: Apr. 14, 1988

Related U.S. Application Data

[63] Continuation of Ser. No. 916,556, Oct. 8, 1986, abandoned.

[30] Foreign Application Priority Data

Oct. 9, 1985 [IT] Italy .............................. 22410 A/85

[51] Int. Cl.$^4$ ...................... B32B 27/36; B32B 27/08; B29D 7/02
[52] U.S. Cl. ................................. 428/412; 428/423.9; 428/423.7; 428/424.4; 428/424.7; 428/424.8; 428/448; 428/451; 428/483; 428/493; 428/495; 264/176.1
[58] Field of Search .................. 428/412, 424.4, 424.8, 428/424.7, 423.9, 448, 451, 483, 493, 495, 423.7

[56] References Cited

U.S. PATENT DOCUMENTS 4,405,547 9/1983 Koch et al. .......................... 284/171
4,483,812 11/1984 Hahn et al. .......................... 284/171

FOREIGN PATENT DOCUMENTS 2119934 11/1972 Fed. Rep. of Germany .
1354907 5/1974 United Kingdom .

OTHER PUBLICATIONS

*British application No. '907 is the English language equivalent to the German patent.

Primary Examiner—P. C. Ives
Attorney, Agent, or Firm—Stevens, Davis, Miller & Mosher

[57] ABSTRACT

Multilayer polymeric coextruded slabs and structural shapes obtained by contemporaneous extrusion of different polymers in a single extrusion head wherein at least one of the different layers consists of a lamina of a vinyl-aromatic polymer containing up to 20% by weight of an ethylenically unsaturated nitrile.

The present invention relates to multilayer polymeric coextruded slabs and structural shapes and to the process for obtaining them.

More particularly, the present invention relates to multilayer polymeric coextruded slabs and structural shapes wherein the adhesion is performed by coupling to the polymeric layers a sheet of a vinyl-aromatic polymer containing an ethylenically unsaturated nitrile.

13 Claims, 1 Drawing Sheet

MULTILAYER POLYMERIC COEXTRUDED SLABS AND STRUCTURAL SHAPES

This application is a continuation of application Ser. No. 916,556, filed Oct. 8, 1986, now abandoned.

BACKGROUND OF THE INVENTION

The preparation of multilayer extruded articles in the form of slabs, films, structural shapes, etc., is increasingly developing in the modern industry for the processing of plastic materials because of the technical and economical advantages involved.

The technique for obtaining the slabs, etc., allows to perform, by the suitable combination of different extruded polymers, multilayer composites having special practical performances which cannot be obtained by the use of a single polymer.

The above-mentioned multilayer composites may be obtained according to two different processes, that is by lamination or by coextrusion.

The lamination method which has been used till now for flat slabs, foresees the application on the slab, at the outlet of the extrusion head, of one or more performed films of other polymers by a slight deflection between the hot rollers of a rotary press.

The coextrusion method, on the contrary, foresees the simultaneous extrusion of many polymers which flow together to a single head wherein the stratified flows of the different components are coupled, thus giving the multilayer extruded article.

The production of coextruded composites is used for different purposes. For instance, to give specified surface effects (brilliance of opacity) to aesthetically poor materials. Or it is used to obtain composites showing particular properties at acceptable costs. Generally, there have been attempts to couple a carrier base polymer with one or more thin layers of valuable polymers able to give particular properties, such as, for instance, the resistance to external agents, barrier properties against moisture or gas diffusion, or a better resistance to abrasion or scratching of the article, etc.

The necessary condition to obtain a good multilayer composite is that the different polymers are compatible among them so that a good adhesion among the layers of the different polymers used is obtained.

In the event that the polymers used are not sufficiently compatible, the additional use of adhesive agents is employed and there is the problem of recovering scraps which weighs heavily negatively on the cost of the process.

Vinyl-aromatic polymers, such as anti-shock polystyrene, owing to a good processing balance, properties and cheapness, are attractive materials as carrier base resins for the production of multi-layer coextruded composites. However, their use as such is limited because of their incompatibility with some polymers such as, for instance, technopolymers and polar polymers in general. For instance, this is the case with the multilayer coextruded composites of anti-shock polystyrene (HIPS) with special technical polymers such as polymethylmethacrylate (PMMA), polycarbonate (PC), thermoplastic polyurethane (TPU), polybutyleneterephthalate (PBT), acrylonitrile-butadiene-styrene terpolymer (ABS) and the like.

Therefore, in the above mentioned case there is noted a poor adhesion of the layers with signs of delamination either on the coextruded slabs or on the manufactured articles obtained therefrom by thermoforming.

THE PRESENT INVENTION

An object of the present invention is to provide multilayer polymeric coextruded slabs and structural shapes which do not show the above-mentioned drawbacks.

More particularly, an object of the present invention is to provide multilayer polymeric coextruded slabs and structural shapes on carriers based on vinyl-aromatic polymers.

We have found, surprisingly, that these and other objects are achieved by means of multilayer polymeric slabs and structural shapes obtained by simultaneous extrusion of different polymers in a single extrusion head wherein at least one of the different layers consists of a lamina of a vinyl-aromatic polymer containing up to 20% by weight of an ethylenically unsaturated nitrile.

Specifically, we have found, that by the use of a vinyl-aromatic polymer modified with a quantity of from about 5 to 15% by weight of an ethylenically unsaturated nitrile, coextruded multilayer slabs and structural shapes are obtained showing a high adhesion.

The coextrusion process is carried out by means of a conventional type device, with extrusion temperature depending on the materials used but which generally are comprised between 180° and 250° C.

The finished composite is allowed to go through a multi-roller calender, the rollers of which are kept at a temperature comprised between 20° and 85° C. to favor the adhesion and cool the coextruded material.

By the term "vinyl-aromatic polymer" as used in the present description, as well as in the claims, there is intended any thermoplastic solid polymer and corresponding copolymer consisting for the most part, that is containing, chemically bound, at least 50% by weight of one or more vinyl-aromatic compounds of the formula:

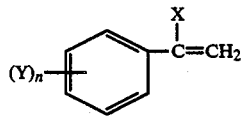

wherein X represents hydrogen or an alkyl radical containing from 1 to 4 carbon atoms; Y represents a halogen or an alkyl radical containing from 1 to 4 carbon atoms and n is 0 or an integer of from 1 to 5, extremes included.

Examples of vinyl-aromatic compounds having the above reported formula are: styrene; methylstyrene; mono-, di-, tri-, tetra-, and penta-chloro-styrene and the corresponding alphamethyl-styrenes, styrenes alkylated in the nucleus and the corresponding alpha-methyl-styrenes such as ortho and paramethyl-styrenes, ortho and para-ethyl-styrenes; ortho and paramethyl-alpha-methyl-styrenes, etc.

The term "vinyl-aromatic polymers" includes, also, polystyrenes modified with rubbers, in amounts of from about 3 to about 10% by weight and generally used to make the polymers resistant to impacts.

As rubbers, both natural and synthetic rubbers may be used; synthetic rubbers suitable to this purpose are: polybutadiene, polyisoprene, butadiene and/or isoprene copolymers with styrene or other monomers and which have a glass transition temperature (Tg) lower than −20° C. These butadiene and/or isoprene polymers may contain the monomers in different configuration. In the copolymers, the monomers may be randomly distributed or arranged in bulk or starlike.

Other synthetic rubbers which may be used for the preparation of vinyl-aromatic anti-shock copolymers modified according to the present invention are the saturated rubbers such as ethylene-propylene rubbers, ethylene-propylene-dienes terpolymers (EPDM), silicon rubbers containing unsaturated groups, etc.

The vinyl-aromatic polymer modified with an ethylenically unsaturated nitrile may be obtained according to any known polymerization process provided that as starting monomers a mixture of vinyl-aromatic/unsaturated nitrile monomers is used.

The more ususal polymerization processes are, as known, the suspension polymerization, the bulk-suspension polymerization and the continuous bulk-polymerization, which are widely described in the literature, such as, for instance, in U.S. Pat. Nos. 2,694,692 and 2,862,906; in Amos, Polym. Eng. Sci., 14 (1974), 1, pages 1–11. Furthermore, other processes may be used such as emulsion polymerization or suspension polymerization starting from rubber latices, provided that they allow to obtain materials showing the above-indicated characteristics.

According to the bulk-suspension polymerization process, the rubber is first dissolved in the mixture of vinyl-aromatic/unsaturated nitrile monomers and the mass is subjected to a thermal or catalytic polymerization up to a conversion of about 30%, and generally not higher than 50%.

After this first prepolymerization step, the mass is dispersed in water under strong agitation and with the aid of suspending agents, and undergoes the copolymerization following a suitable and well-known thermal cycle.

The range of the reaction temperature may be comprised between 50° and 170° C. and preferably between 100° and 160° C.

The copolymerization is generally carried out in the presence of oil-soluble catalysts, which may be added either at the beginning or during the polymerization. Suitable catalysts are benzoyl peroxide, lauryl peroxide, di-cumyl peroxide, di-tert.butyl perbenzoate, di-tert.butyl peroxide, etc.

Also, the prepolymerization may be thermically started. If desired, a chain-transfer agent may be used, such as, for instance, tert.-dodecylmercaptane or the like.

As suspending agents there may be used either water-soluble organic compounds, such as polyvinyl alcohol, acrylic copolymers, cellulose derivatives, polyvinyl acetate partially saponified, etc., or water-insoluble inorganic compounds such as tricalcium phosphate, barium sulphate, etc., alone or mixed with a surface-active agent, or sodium sulfite. Suspending agents are generally used in an amount comprised between 0.1 and 5% by weight on the organic phase.

The copolymerization may be carried out also directly in suspension without prepolymerizing the mass, provided that the agitation of the mass is performed in such a manner as to obtain a suitable precipitation and dispersion of the rubber particles grafted on the polymeric matrix.

According to the continuous bulk polymerization process, the rubber solution in the mixture of vinyl aromatic/unsaturated nitrile monomers is fed continuously and copolymerized in reactors arranged in series and agitated, according to a well defined temperature cycle, up to a conversion higher than 50%.

The mass is then devolatilized under vacuum to remove the unreacted monomers, which are suitably recycled to the first reactor.

The copolymerization is generally performed thermally in the presence of diluents, the most common of which is ethylbenzene.

The temperature range is comprised between 50° and 240° C. and preferably between 100° and 220° C.

Any polymer which can be flat extruded may be used for the preparation of the multilayer slabs and structural shapes which are the object of the present invention.

Preferred polymers are technopolymers, or alloys thereof, characterized by high mechanical properties, in particular those having a modulus of elasticity comprised between 5,000 and 50,000.

Examples of technopolymers are:
(A) aromatic polycarbonates;
(B) thermoplastic polyurethanes;
(C) crystalline aromatic polyesters;
(D) styrene-butadiene-acrylonitrile terpolymers;
(E) styrene-acrylonitrile copolymer;
(F) resins of acrylic esters; and
(G) anti-shock polystyrene.

(A) Aromatic polycarbonates are known products; they have the following recurring unit:

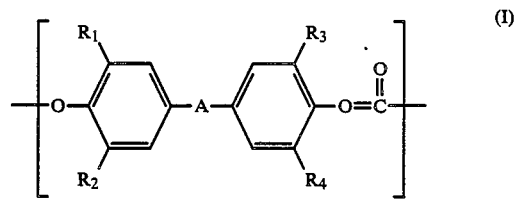

wherein $R_1$, $R_2$, $R_3$ and $R_4$ represent hydrogen or an alkyl radical containing from 1 to 3 carbon atoms; and A represents —O—, —CO—, —SO$_2$—, an alkylene radical containing from 1 to 10 carbon atoms, an alkylidene radical containing from 1 to 10 carbon atoms, a cyclo-alkylene radical containing from 5 to 15 carbon atoms, a cyclo-alkylidene radical containing from 5 to 15 carbon atoms or the radical:

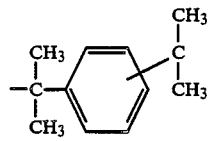

The aromatic polycarbonates containing the recurring unit (I) are available on the market from many sources, for instance, General Electric Company, Pittsfield, Mass., USA, under the trade-name LEXAN; Enichimica S.p.A., San Donato Milanese (Milan, Italy) under the trade-name SINVET, etc.

Generally, any aromatic polycarbonate may be used, even if those obtained from bisphenol A are particularly preferred.

Polycarbonates used for preparing the composites of the present invention have an average molecular weight comprised between 10,000 and oer 200,000 and preferably between 20,000 and 60,000.

(B) Thermoplastic polyurethanes consist of long-chain polyols having a molecular weight comprised between 400 and 10,000 of poly-isocyanates, preferably di-isocyanates, and of chain-extensors, preferably short-chain polyols having a molecular weight up to 380. In these polyurethanes the equivalent ratio between isocyanate groups and active hydrogen atoms (NCO/OH) is preferably comprised between 0.95 and 1.1 and in particular between 0.98 and 1.08. Substantially linear polyols having a molecular weight comprised between 400 and 10,000, and preferably between 800 and 6,000 which may be used for preparing the thermoplastic polyurethanes comprise: any known polyester, polyacetone, polyether, poly-thio-ether, polyesteramide, polycarbonate, polyacetal containing two or, in relatively small quantity, also three active groups, generally in form of hydroxy groups, vinyl polymers, such as, for instance, poly-butadiene-diols; poly-hydroxy compounds already containing urethane or urea groups, and other compounds containing other active groups such as amino groups, carboxy groups, thiol groups, etc. These compounds are all well known in the art and are described, for instance, in German Pat. Nos. 2,302,564 and 2,423,764 and in U.S. Pat Nos. 3,963,679; 3,984,607 and 4,035,213.

In particular, as polyols, it is preferred to use polyesters containing hydroxy groups of glycols and adipic acid, phthalic acid and/or terephthalic acid and their hydrogenation products; hydroxylated polycarbonates; polycaprolactones, poly-ethylene-oxide; polypropylene-oxide and mixed polyethers of ethylene and propylene oxide.

Polyesters of glycols and adipic acid and polycaprolactone diols are particularly preferred.

Di-isocyanates which may be used for preparing thermoplastic polyurethanes comprise essentially any aliphatic, cycloaliphatic, aromatic, arylaliphatic and heterocycle di-isocyanate and, mainly, those of the generally known type and described in the above mentioned German and U.S. Patents. The particularly preferred di-isocyanates are hexamethylen-di-isocyanate, isoforon-di-isocyanate, di-phenylmethane-di-isocyanate and naphthalene-1,5-di-isocyanate which may be optionally substituted by methyl groups.

The above mentioned di-isocyanates may be used alone or mixed with up to 15% by moles of a higher polyisocyanate, in such a manner that the product obtained is still fusible or thermoplastic.

The chain-extensors used for preparing polyurethanes are well known and described, for instance, in the above mentioned German and U.S. patents. Some examples of suitable low-molecular weight chain extensors are: poly-alcohols, preferably glycols; poly-amines, hydrazines, hydrazides, etc. Amino-alcohols such as ethanol-amine, diethanolamine, triethanolamine, 3-amino-propanol, etc., may also be used. Preferred chain extensors are ethyleneglycol, di- and tri-ethyleneglycol, 1,4-butanediol, 1,6-hexanediol and hydroquinone-di-hydroxy-ethyl-ether.

Polyurethanes used for manufacturing multilayer composites of the present invention may contain rubber, hydrolysis and oxidation stabilizers, anti-oxidizing agents such as 2,6-tert.butyl-4-methylphenol, sterically impeded phenols or amines, etc. Thermoplastic polyurethanes are available on the market from many sources, for instance:

| MANUFACTURER | TRADENAME |
| --- | --- |
| Getis - Vigevano (PV) | Gethane |
| B. F. Goodrich Chemical-Italia (MI) | Estane |
| Bayer | Desmopan |
| Upjohn | Pellethane. |

(C) Crystalline aromatic polyesters are obtained by polymerizing a glycol of the formula:

$$HO-(CH_2)_r-OH \quad \text{(II)}$$

wherein r is an integer comprised between 2 and 10, and a dicarboxylic acid of the formula:

$$HOOCR_5-B-R_6-COOH \quad \text{(III)}$$

wherein each $R_5$ and $R_6$ represents $-(CH_2)_m$ wherein m is zero or an integer comprised between 1 and 4, and B is a bivalent aromatic radical represented by:

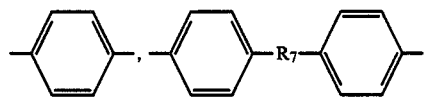

wherein $R_7$ may be:

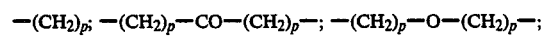

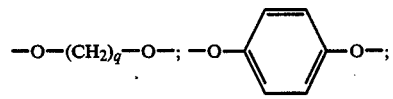

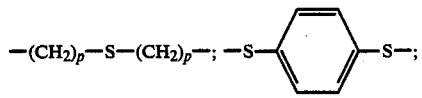

$-S-(CH_2)_p-S-; -SO_2-;$ wherein p may be zero or an integer comprised between 1 and 4 and q is an integer comprised between 1 and 5.

Representative examples of crystalline polyesters obtained by polymerizing a glycol (II) with a dicarboxylic acid (III) are: polyethylene terephthalate, polybutylene terphthalate and polyethylene-2,2'-di-phenoxy-ethane-4,4'-dicarboxylate, etc.

The above-mentioned crystalline polyesters have preferably a molecular weight comprised between 10,000 and 160,000. Manufacturers of said resins are:

| MANUFACTURER | TRADE NAME |
| --- | --- |
| Montedipe | Pibiter; |
| General Electric Company | Valox. |

(D) Styrene-butadiene-acrylonitrile terpolymers, known as ABS resins are obtained according to the process described in U.S. Pat. No. 3,130,177.

ABS resins are the most known. They may be found on the market in a very wide range and manufactured by different manufacturers.

Examples are:

| MANUFACTURER | TRADE NAME |
| --- | --- |
| Enichim Polimeri | Urtal |
| Bayer | Novodur |
| Monsanto | Lustran |
| Basf | Terluran |
| Borg Warner | Cycolac. |

(E) The styrene-acrylontrile copolymer, known as SAN resin, is commonly manufactured by the suspension polymerization process or by bulk-continuous or emulsion polymerization processes. The concentration of bound acrylontrile may vary from 23 to 35%, the intrinsic viscosity of the finished product is comprised between 0.07 and 0.1 l/g.

SAN resins are available on the market from many manufacturers, for instance:

| MANUFACTURER | TRADE NAME |
| --- | --- |
| Montedipe | Kostil |
| Monsanto | Lustran |
| Basf | Luran |
| Dow | Tyril. |

(F) The resins of acrylic esters, such as polymethylmethacrylate are prepared as described in Kirk Othmer, Encylopaedia of Chemical Technology, vol. 1, page 386, 1987. Known acrylic resins which are found on the market are those manufactured by:

| MANUFACTURER | TRADEMARK |
| --- | --- |
| Vedril | Vedril |
| ICI | Perspex. |

(G) Anti-shock polystyrene is manufactured by many companies; among these:

| MANUFACTURER | TRADEMARK |
| --- | --- |
| Montedipe | Edistir. |

Figure 2:
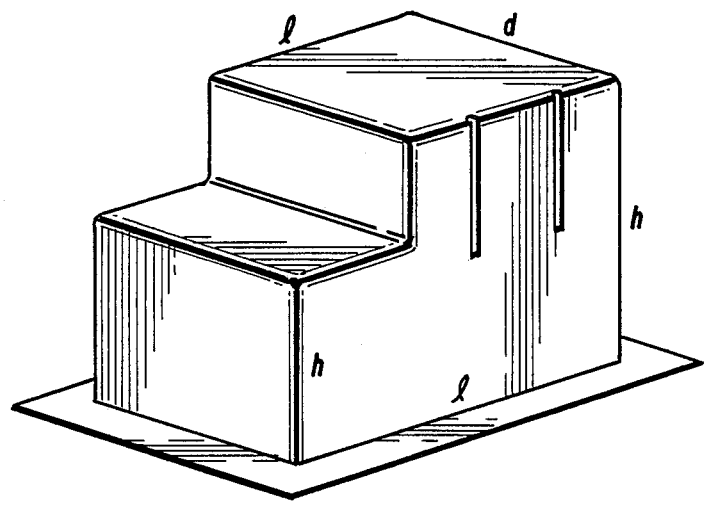

In the accompanying drawing:

FIG. 1 is a schematic illustration of means for obtaining an extrudate according to the invention, and FIG. 2 illustrates a slab formed of the extrudate.

The process of the present invention may be better illustrated according to the scheme of FIG. 1 of the accompanying drawings wherein, as example, only three estruders (1), (2), (3) are illustrated; the number of the extruders, in fact, may be different according to the final composite which is desired.

The three extruders go together to a coextrusion head (4) from which the multilayer composite (5) is recovered which is cooled through the rollers (6), (7) and (8) of a calender and is drawn by means of the train (10).

The slab goes on for further operations, such as cutting or winding, which do not appear in the drawing.

In the upper part the calender is provided with a roller (9) from which it is possible to unwind a preformed film of polymer to be coupled, by lamination, on the slab (5) at the outlet of the coextrusion head.

To better understand the present invention and practically perform the same, herein after some illustrative but not limiting examples are reported.

EXAMPLE 1 (Comparative)

The apparatus of FIG. 1 of the drawing is used. The central extruder has a diameter of 45 mm and L/D ratio of 25; the two side extruders have a diameter of 30 mm and L/D ratio of 25. The three extruders converge to a coextrusion head provided with "Black Box" manufactured by Omipa (flat head type "TPL") suitable for maufacturing a 400 mm wide slab having a variable thickness from 0.5 to 4 mm. HIPS of the type EDISTIR SRL 600 is fed into the extruder 1 and into the extruder 3 there is fed PMMA type VEDRIL 8. A 3.5 mm thick composite slab is coextruded having an upper layer of PMMA (thickness 0.5 mm) and a 3 mm lower HIPS layer.

The extrusion conditions are reported in Table I.

The two coextruded polymer layers do not show adhesion and are easily separated by hand.

EXAMPLE 2

By working as in Example 1, but by feeding into the extruder 1 the vinyl aromatic copolymer having the following composition: 72% styrene, 8% acrylonitrile, 8% polybutadiene, 12% alpha-methyl-styrene, a coextrudate with PMMA is obtained the adhesion of which is very good. The extrusion conditions are reported in Table I.

These slabs are thermoformed on a thermoforming machine TERMOFORMING "TEMP" thus obtaining a shell having the shape shown in FIG. 2 of the drawing and the following sizes: h=240 mm; h'=150 mm; l=270 mm, l'=200 mm. The slab is thermoformed both with the PMMA film in the inside part and in the outside part of the cell.

In both cases, no delamination signs are observed on the shells.

EXAMPLE 3

Working as in Example 1, there is fed into the extruder 2 a vinyl-aromatic copolymer having the same composition as in Example 2, which acts as adhesive between HIPS and PMMA. The extrusion conditions are reported in Table I.

The thus obtained slab, unlike the slab of Example 1, shows no signs of delamination also after thermoforming under the conditions of Example 2.

EXAMPLE 4

By working as in Example 1, but feeding into extruder 1 a vinyl aromatic copolymer having the following composition: 20% acrylonitrile, 8% butadiene, 72% styrene, a composite with PMMA is obtained which shows a good adhesion. The extrusion conditions are reported in Table I.

No signs of delamination are observed also after thermoforming of shells obtained under the conditions of Example 2.

EXAMPLE 5

By using the apparatus of FIG. 1, and feeding into the extruder 1 the vinyl-aromatic copolymer of Example 4 mixed with 50% of a copolymer containing 20% acrylonitrile, 10% EPDM rubber, 70% styrene and coupling, by lamination, a 0.07 mm. thick film consisting of PMMA type VEDRIL 8, unwound from the reel and applied by means of calenders 6 and 7, a good adhesion of the film is obtained, which remains also after thermoforming. The lamination conditions are reported in Table I.

EXAMPLE 6

Example 1 is repeated, except that 3 PC type SIN-VET 221 is fed into the extruder and extruded at the temperature of 240° C.

The coextruded slabs do not show a good adhesion, which is also shown by clear signs of delamination on the thermoformed pieces.

EXAMPLE 7

Example 2 is repeated except that 3 PC is fed into the extruder.

The slabs thus obtained show a good adhesion and signs of delamination are not seen on the thermoformed shells.

EXAMPLE 8

Proceeding as in Example 3, but feeding 3 PC into the extruder, a multilayer slab is obtained which shows a good adhesion of the layers.

EXAMPLE 9

Working as in Example 1, but feeding a 50/50 mixture of TPU GETHANE I/98 and SAN Kostil AF3 copolymer into the extruder 3 and then extruding at the temperature of 190° C., the coextruded slabs are obtained which do not show a good adhesion.

EXAMPLE 10

Working as in Example 3 but feeding the TPu/SAN mixture of Example 9 into extruder 3, slabs are obtained which show a good adhesion. Delamination signs on the thermoformed cells are absent.

EXAMPLE 11

Proceeding as in Example 1 but feeding type PIB-ITER N 100 into extruder 3, extrusion is carried out at the temperature of 230° C.

EXAMPLE 12

Proceeding as in Example 3 but feeding PBT into the extruder 3, slabs are obtained which show good adhesion. Signs of delamination on the thermoformed cells are absent.

EXAMPLE 13

Example 5 is repeated but the lamination is carried out using a ABS type NOVODUR RF film having a thickness of 0.07 mm.

The film shows good adhesion to the vinyl-aromatic copolymer slab.

EXAMPLE 14

Working as in Example 13, but feeding HIPS type EDISTIR SRL 600 into extruder 1, film does not show a good adhesion to the HIPS slab.

EXAMPLE 15

The work is carried out as in Example 2 but into the extruder 3 a copolymer is fed containing 16% acrylonitrile, 10% EPDM, 74% styrene and the operation is carried out at the temperature 220° C.

The multilayer slabs obtained show a good adhesion also after thermoforming of the shells.

EXAMPLE 16

Proceeding as in Example 1 but feeding into the extruder 1 HIPS type EDISTIR SRL 600 and into the extruder 3 SAN type KOSTIL AF having a thickness of 0.05 mm is fed.

The composite obtained shows a poor adhesion.

EXAMPLE 17

Working as in Example 2 but feeding SAN type Kistil AF into extruder 3, a composite is obtained the layers of which show good adhesion.

EXAMPLE 18

The work is carried out as in Example 8 but a SAN copolymer with 8% acrylontrile is fed into extruder 2.

The obtained composite slab shows a good adhesion of the layers of the different polymers.

TABLE I

| Example No. | EXTRUSION CONDITIONS | | | | |
|---|---|---|---|---|---|
| | 1 | 2 | 3 | 4 | 5(°) |
| Temp. Extruder | | | | | |
| 1 °C. | 205 | 215 | 205 | 210 | 215 |
| 2 °C. | — | — | 210 | — | — |
| 3 °C. | 200 | 200 | 200 | 200 | — |
| Extruder capacity | | | | | |
| 1 Kg/h | 26.5 | 25.0 | 24.0 | 25.5 | 26.0 |
| 2 Kg/h | — | — | 4.0 | — | — |
| 3 Kg/h | 4.5 | 4.2 | 4.0 | 4.2 | — |
| Head temp. °C. | 210 | 210 | 210 | 210 | 210 |
| Roller temp. Calenders | | | | | |
| 1 °C. | 75 | 80 | 75 | 75 | 110 |
| 2 °C. | 80 | 85 | 85 | 85 | 100 |
| 3 °C. | 90 | 95 | 95 | 95 | 80 |

(°) Lamination with PMMA film

We claim:

1. Multilayer polymeric co-extruded slabs and structural shapes obtained by simultaneous extrusion of different polymers in a single extrusion head, but without a separately added adhesive, wherein at least one of the different layers consists of a vinyl-aromatic polymer lamina containing up to 20% by weight of an ethylenically unsaturated nitrile.

2. Multilayer polymeric coextruded slabs and structural shapes as in claim 1, wherein the vinyl-aromatic polymer contains between 5 and 15% by weight of an ethylenically unsaturated nitrile.

3. Multilayer polymeric coextruded slabs and structural shapes according to claim 1, wherein the vinyl-aromatic polymer consists of at least 50% by weight of at least one vinyl aromatic compound of the formula:

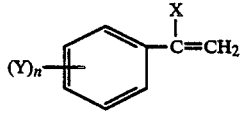

wherein X is selected from the group consisting of hydrogen, and alkyl radicals containing from 1 to 4 carbon atoms, Y is selected from the group consisting of halogen and alkyl radicals containing from 1 to 4 carbon atoms and n is an integer from zero to 5.

4. Multilayer polymeric coextruded slabs and structural shapes according to claim 3, wherein the vinyl aromatic polymer is selected from the group consisting of styrene, methyl-styrene, mono-, di-, tri-, tetra- and penta-chlorostyrenes and the corresponding alpha-methyl-styrenes, styrenes alkylated in the nucleus and the corresponding alpha-methyl-styrenes, ortho and para-ethyl-styrenes, and ortho nad para-methyl-alpha-methyl-styrenes.

5. Multilayer polymeric coextruded slabs and structural shapes according to claim 1, wherein the vinyl-aromatic copolymer comprises polystyrenes modified with rubbers in amounts of from about 3 to about 10% by weight.

6. Multilayer polymeric coextruded slabs and structural shapes according to claim 5, wherein the rubbers are selected from natural and synthetic rubbers.

7. Multilayer polymeric coextruded slabs and structural shapes according to claim 6, wherein the synthetic rubbers are selected from the group consisting of polybutadiene, polyisoprene, butadiene and/or isoprene copolymers with styrene or other monomers having a glass transition temperature lower than −20° C., ethylene-propylene saturated rubbers, ethylenpropylene-dienes terpolymers and silicon rubbers containing unsaturated groups.

8. Multilayer polymeric coextruded slabs and structural shapes according to claim 1, wherein the ethylenically unsaturated nitrile is acrylonitrile or methacrylonitrile.

9. Multilayer polymeric co-extruded slabs and structural shapes obtained by simultaneous extrusion in a single extrusion head, but without a separately added adhesive, of (1) at least one polymer having a modulus of elasticity of from about 5,000 to about 50,000 selected from the group consisting of aromatic polycarbonate, thermoplastic polyurethane, crystalline aromatic polyesters, styrene-butadiene-acrylonitrile terpolymer, styrene-acryloniltrile copolymer, anti-shock polystyrene, resins of acrylic esters, polyethyleneterephthalate, polybutyleneterephthalate, polyethylene-2,2'-diphenoxyethane-4,4'-dicarboxylate, polymethylmethacrylate, and (2) a vinyl-aromatic polymer containing up to 20% by weight of an ethylenically unsaturated nitrile.

10. Multilayer polymeric coextruded slabs and structural shapes according to claim 9, wherein the polymers for the preparation of the slabs and structural shapes are selected from polymers having a modulus of elasticity of from about 5,000 to about 50,000.

11. Multilayer polymeric coextruded slabs and structural shapes according to claim 10, wherein the polymers are selected from the group consisting of aromatic polycarbonate, thermoplastic polyurethane, crystalline aromatic polyesters, styrene-butadiene-acrylonitrile terpolymer, styrene-acrylonitrile copolymer, resins of acrylic esters and anti-schock polystyrene.

12. Multilayer polymeric coextruded slabs and structural shapes according to claim 1, wherein the polymers are selected from the group consisting of polyethyleneterephthalate, polybutyleneterephthlate and polyethylene-2,2'-diphenoxyethane-4,4'-dicarboxylate.

13. Multilayer polymeric coextruded slabs and structural shapes according to claim 11, wherein the polymer is polymethylmethacrylate.

* * * * *